Aug. 14, 1962  A. H. MARK ETAL  3,048,981
CONTROL MECHANISM FOR TRACTOR HYDRAULIC SYSTEMS
Filed May 21, 1959  7 Sheets-Sheet 1

INVENTORS.
ALEXANDER HING MARK
LAWRENCE AU
BY
Wolfe, Hubbard, Voit & Osann
ATTORNEYS.

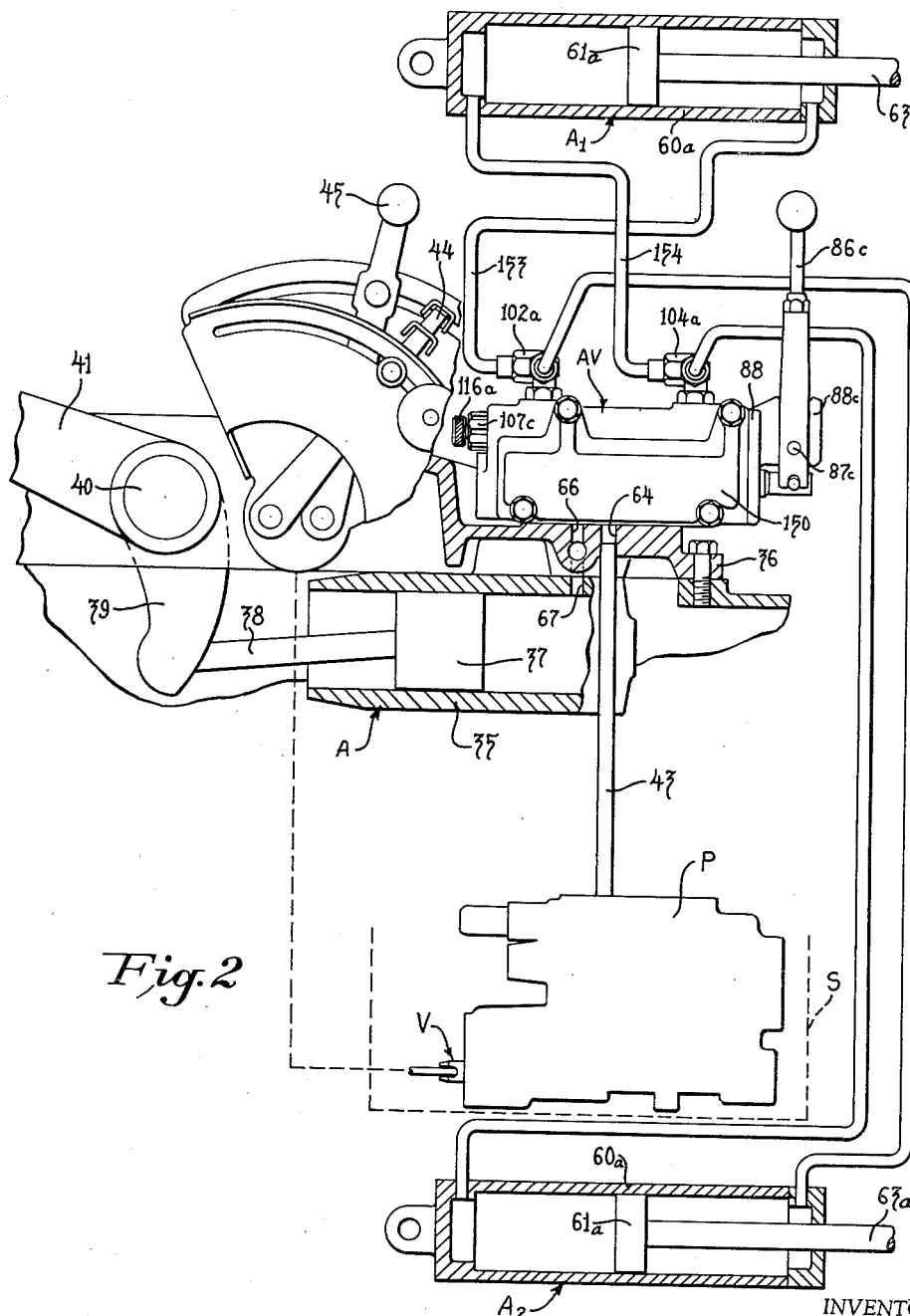

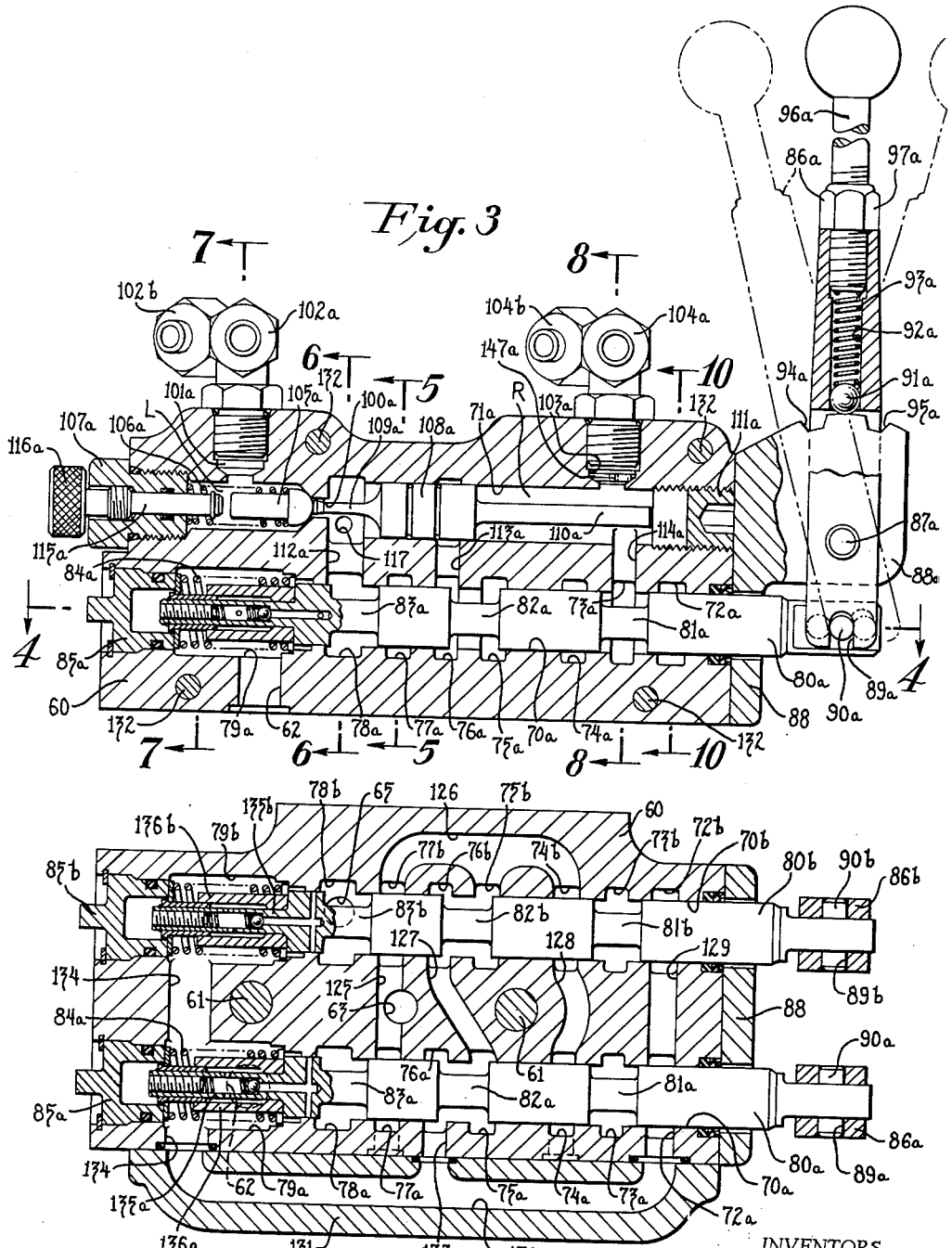

INVENTORS.
ALEXANDER HING MARK
LAWRENCE AU
BY

ATTORNEYS.

Aug. 14, 1962  A. H. MARK ETAL  3,048,981
CONTROL MECHANISM FOR TRACTOR HYDRAULIC SYSTEMS
Filed May 21, 1959  7 Sheets-Sheet 7

INVENTORS.
ALEXANDER HING MARK
LAWRENCE AU
BY
Wolfe, Hubbard, Voit & Osann
ATTORNEYS.

United States Patent Office 3,048,981
Patented Aug. 14, 1962

3,048,981
CONTROL MECHANISM FOR TRACTOR
HYDRAULIC SYSTEMS
Alexander Hing Mark, Livonia, and Lawrence Au, Detroit, Mich., assignors to Massey-Ferguson Inc., Racine, Wis., a corporation of Maryland
Filed May 21, 1959, Ser. No. 814,816
13 Claims. (Cl. 60—97)

The invention relates to controls for hydraulic systems of the type provided in tractors for raising and lowering a trailing hitch linkage under joint control of manually operable and draft responsive means and it is more particularly concerned with improved valve mechanism for supplementing the conventional controls of the tractor to adapt the system for the operation and control of one or more auxiliary actuators.

A primary object of the invention is to provide improved valve mechanism which affords a wider range of control over the auxiliary actuators operated with hydraulic systems of the above general character and which permits the use of auxiliary actuators of either the single or double acting type or various combinations of such actuators.

Another object is to provide valve mechanism by which auxiliary actuators mounted on the tractor or on implements coupled to the tractor may be operated under manual control or under control of the tractor's draft responsive means.

A more specific object is to provide valve mechanism including check valve means operative to restrict flow through the valve to one direction and embodying novel fluid operated means for opening the check valve to permit reverse fluid flow when required.

Still another object is to provide auxiliary valve mechanism settable to exercise complete control over the main actuator of the tractor hydraulic system and one or more auxiliary actuators or to transfer control of such actuators to the tractor's draft responsive control means.

A further object is to provide auxiliary valve mechanism that can be installed in conventional tractors without changes or modifications in the hydraulic system or structural modifications of the tractor and which permits normal operation of the tractor when desired by the controls conventionally provided for that purpose.

It is also an object of the invention to provide auxiliary valve mechanism which is rugged and durable in construction and which, while providing an unusually wide range of control, is nevertheless simple and inexpensive to manufacture.

Other objects and advantages of the invention will become apparent from the following detailed description of the preferred embodiment illustrated in the accompanying drawings in which FIGURE 1 is a side elevational view of a tractor-implement combination equipped with control valve mechanism embodying the features of the invention.

FIG. 2 is a partly sectioned and partly diagrammatic view showing portions of the tractor hydraulic system and controls shown in FIG. 1, illustrating the manner in which the improved valve mechanism is connected with the system and with the auxiliary actuators for the implement.

FIG. 3 is a sectional view through the auxiliary valve mechanism taken in a vertical plane along the axis of the movable valve member of one of the valve units.

FIG. 4 is a sectional view through the valve mechanism taken in a plane substantially on the line 4—4 of FIG. 3.

FIGS. 5, 6, 7 and 8 are transverse sectional views through the valve mechanism taken respectively in planes substantially on the line 5—5, 6—6, 7—7 and 8—8 of FIG. 3.

Figure 6:
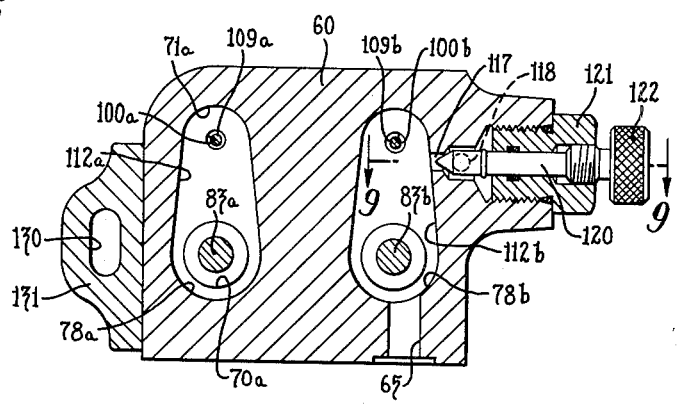
Figure 7:
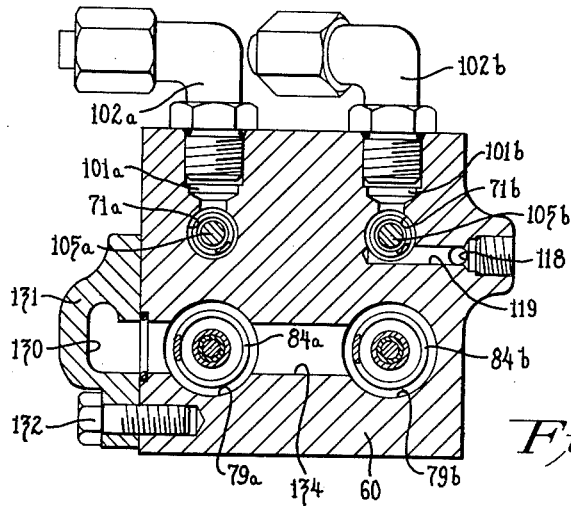
Figure 9:
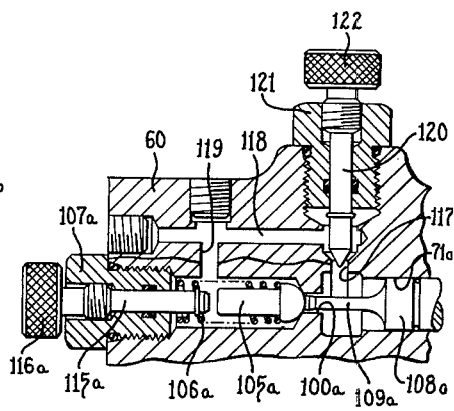

FIG. 9 is a fragmentary sectional view taken in a plane substantially on the line 9—9 of FIG. 6.

Figure 10:
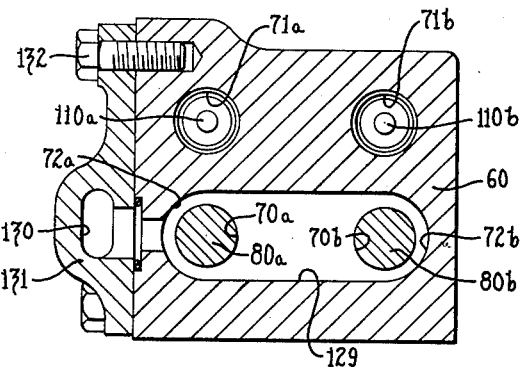

FIG. 10 is a sectional view taken in a plane substantially on the line 10—10 of FIG. 3.

Figure 11:
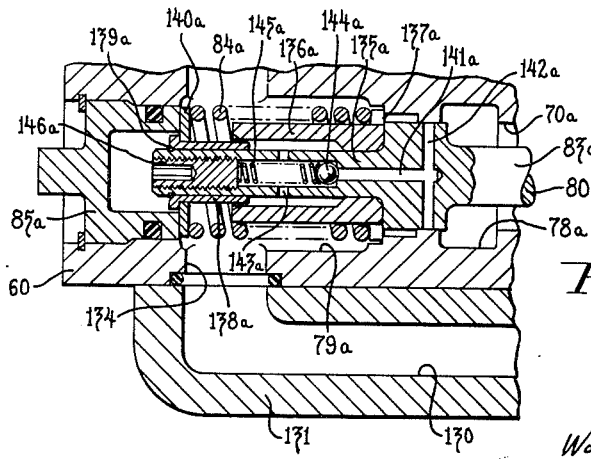

FIG. 11 is an enlarged fragmentary sectional view of the restoring mechanism associated with one end of each movable valve member for returning it to neutral position, the section being taken in the same plane as FIG. 4.

Figure 12:
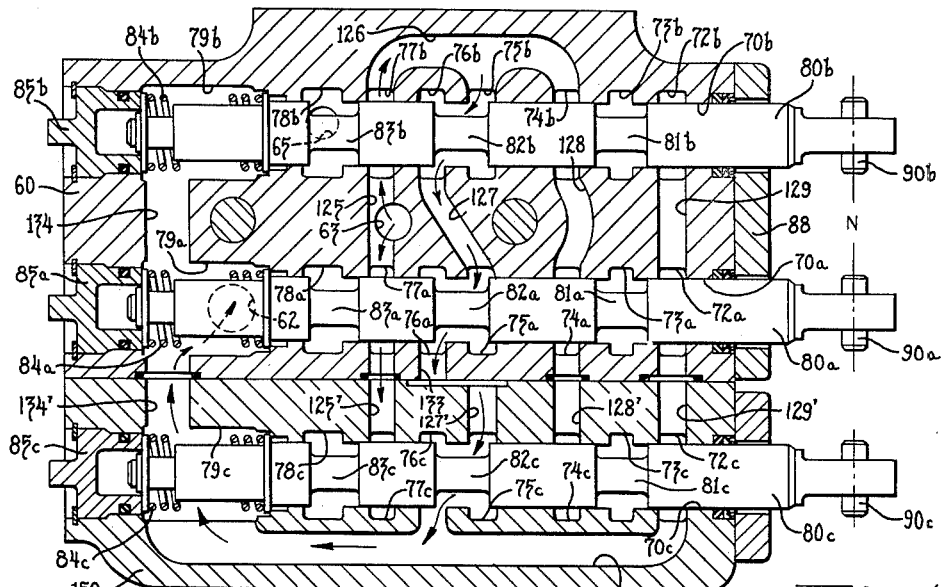

FIG. 12 is a sectional view similar to FIG. 4 but showing the addition of a third valve unit to the basic two-unit valve assembly.

Figure 13:
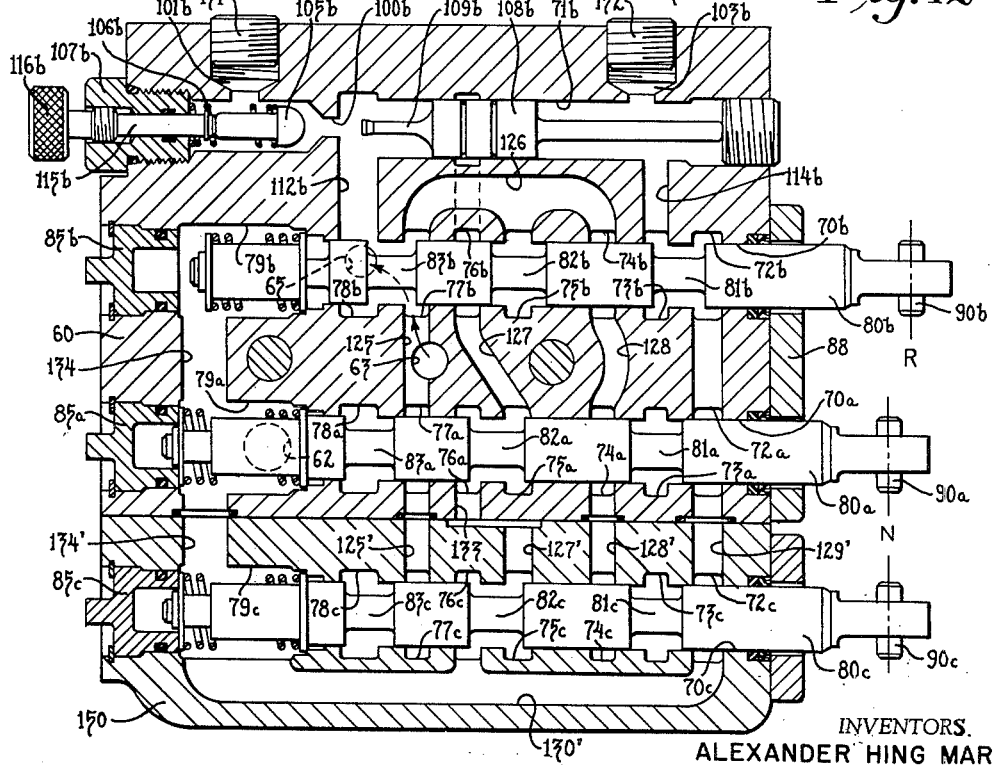

FIG. 13 is a sectional view of the valve mechanism shown in FIG. 12 developed to show in vertical section the components of one valve unit which are located above the valve spool.

Figure 14:
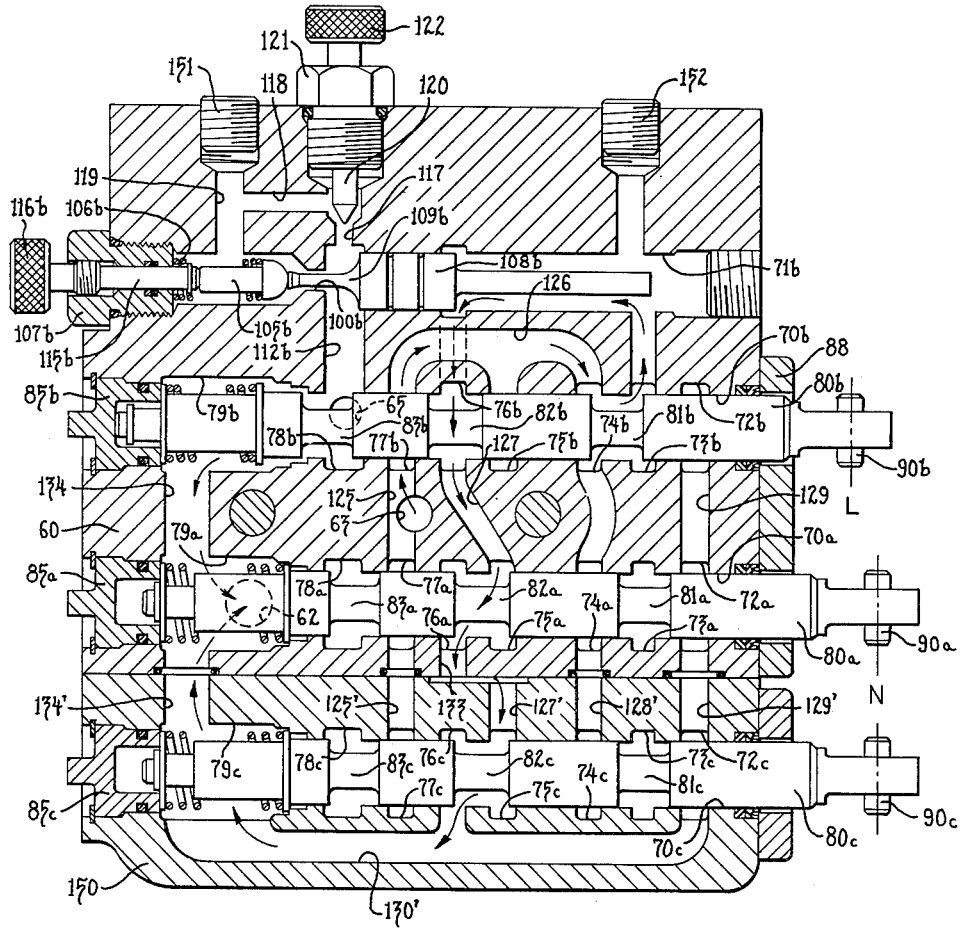

FIG. 14 is a sectional view of the valve mechanism shown in FIG. 13 further developed to show in both horizontal and vertical sections the components of one valve unit which are located above the valve spool.

For purposes of illustration, a preferred embodiment of the invention and one example of its association with a hydraulically equipped tractor-implement combination has been shown and will be described herein in some detail. It is to be understood, however, that it is not intended that the detailed character of the disclosure should limit the invention to such particulars. On the contrary, the invention is to cover all modifications and alternative constructions of the valve mechanism and the system in which it is incorporated that may fall within the spirit and scope of the invention as more broadly and generally characterized in the appended claims.

*The Tractor and Hydraulic System*

Simply by way of example, the invention has been shown in association with a tractor T equipped with a mounted implement C in the form of a multiple unit cultivator. The tractor will be recognized by those skilled in the art as a "Ferguson" tractor. It has a center housing 20 which, together with an engine 21 and central gear box 22, constitute the tractor body. The body is supported in this instance by four pneumatic tired wheels including a pair of front wheels 23 and a pair of rear wheels 24. The front wheels afford steering while the drive is through the rear wheels which are powered from the tractor engine through change speed gearing (not shown) in the gear box 22, a differential and axle shafts 25 extending through laterally projecting axle housings 26 which support the rear wheels 24.

The exemplary tractor is equipped with the well-known three-point implement hitch familiar on "Ferguson" tractors including a pair of lower or draft links 30 and an upper or top link 31. The draft links 30 converge forwardly and are trailingly pivoted as at 32 on the rear portion of the center housing to swing vertically about a transverse horizontal axis located below and slightly forward of the axle shafts 25. The pivots also provide for lateral swing of the draft links.

Raising and lowering of the draft links 30 is effected through the medium of a hydraulic power unit powered from the tractor engine. While various forms of hydraulic units are available for use in tractors, that shown corresponds to the form disclosed and claimed in the copending application of Ernest V. Bunting, Serial No. 451,276, filed August 20, 1954, and assigned to the assignee of the present application.

Figure 1:
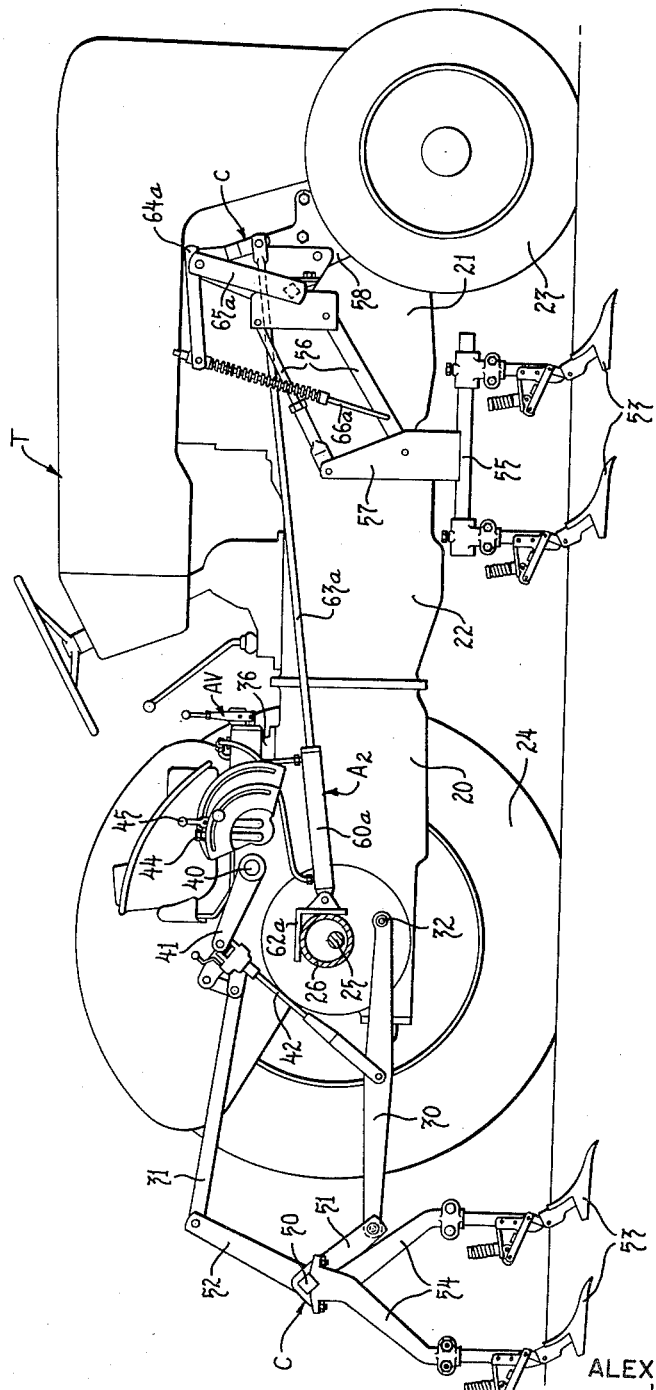

As shown in FIG. 2, the hydraulic power unit of the tractor includes a main hydraulic actuator A in the form of a one-way ram comprising a cylinder 35 bolted or otherwise rigidly secured to the underside of a cover plate 36 closing the upper portion of the center housing. The cylinder opens to the rear and is fitted with a piston 37 having a piston rod 38 projecting rearwardly. The ball shaped ring end of the piston rod is socketed in an arm 39 rigid with a transverse rock shaft 40 journalled in the upper portion of the tractor body, in this instance, in the cover plate 36. The ends of the rock shaft project at opposite sides of the cover plate and each end has a crank arm 41 splined or otherwise non-rotatably fixed thereto. These crank arms are connected to the respective draft links by drop links 42 as shown in FIG. 1. Thus, when the rock shaft is turned in a clockwise direction the draft links are raised while rotation of the rock shaft in a counterclockwise direction lowers the links.

Fluid under pressure is supplied to the cylinder 35 from a pump P (FIG. 2) driven in well-known manner from the tractor engine. The pump, which is preferably of positive displacement type, is located in the center housing below the ram, the lower portion of the housing being flooded with oil and constituting a reservoir or sump S for the hydraulic system. Oil enters the pump through an intake passage cored in the pump body and is discharged from the pump through a pressure supply line or conduit 43 which in the conventional tractor extends to a cover cap or transfer plate (not shown) bolted to the top of the cover plate 36. Passages in the transfer plate afford communication from the conduit to a port opening into the closed end of the cylinder 35.

Delivery of fluid to the actuator as well as exhaust of fluid therefrom is controlled by a main valve V suitably housed in the casing of the pump. The valve is arranged in well-known manner to control the inlet of the pump and the exhaust from the ram cylinder 35. More particularly, the arrangement is such that in a neutral position the valve closes both the pump inlet and the outlet from the conduit 43. When shifted to a "raise" position, the pump inlet is opened and fluid under pressure is delivered through the conduit 43. In the "lower" position, the pump inlet is blocked to interrupt delivery of pressure fluid and conduit 43 is opened to the sump for exhaust of fluid from the ram cylinder.

The present invention is not concerned with the precise construction of the control valve or with the particular mechanism by which it is shifted through its various positions. For present purposes it is sufficient to note that two sources of control action are utilized for shifting the valve—one manual, the other automatic. The automatic action derives from the soil reaction on the implement coupled to the hitch linkage, the force generated by soil reaction being measured by a control spring assembly on the tractor to which the force is applied through the top link 31. The measured force is transmitted to the valve V by a linkage whose effective length is variably adjusted through the medium of a hand lever 44 settable to determine the draft load to be maintained on the hitch linkage.

A second hand lever 45 also operates through a portion of the valve linkage to shift the valve for controlling the raising and lowering of the hitch linkage. Thus, regardless of the setting of the lever 44, movement of the lever 45 to the upper end of its range initiates the operation of the pump to supply fluid to the actuator A and raise the hitch linkage. As the lever 45 is swung downwardly, the valve is shifted to the "lower" position interrupting the operation of the pump and effecting a lowering of the hitch linkage at a rate corresponding to the rate at which the lever is moved. It may be noted that the lever 45 exercises positional control in that the linkage follows the movements of the lever in either direction until the hitch linkage and an attached implement have been lowered to a depth such that the ground reaction on the implement causes the draft responsive mechanism to take over control.

The single main actuator A of the tractor hydraulic system provides all the movements required for the operation of many types of implements as, for example, plows. There are, however, other types of implements that require movements or adjustments in addition to those afforded by the main actuator. Such movements may be effected most conveniently by an auxiliary hydraulic actuator or actuators mounted either on the implement or on the tractor and operatively connected with the tractor hydraulic system.

Depending upon the particular type of implement involved, it may be desirable to provide for operation of the auxiliary actuator or actuators independently of the main actuator. Alternatively, it may be desirable to coordinate the operation of an auxiliary actuator or actuators with the operation of the main actuator. Either type of control is afforded by the novel valve mechanism or auxiliary valving AV provided by the present invention. Installation of this valve mechanism is a simple matter since it is only necessary to remove the cover cap or transfer plate conventionally provided on the tractor and to bolt the valve mechanism in its place on the housing cover plate 36 as shown in FIG. 2.

*The Exemplary Implement*

The implement C shown as mounted on the exemplary tractor T is merely one of the many types embodying auxiliary actuators advantageously controlled by the valve mechanism AV. It will be understood that the valve mechanism is not limited to use with implements such as that shown or to implements mounted on the tractor but that it may be used with implements that are pulled behind the tractor or, in fact, with actuators arranged for operating apparatus having no mechanical connection whatever with the tractor.

The particular implement shown is made up of three independent sections, namely, a rear section and two similar front sections adapted to be mounted respectively on opposite sides of the tractor. The rear section of the exemplary implement comprises a transversely disposed tool bar 50 having a pair of forwardly projecting brackets 51 carrying pins engageable with the usual socketed ball joints provided at the trailing ends of the draft links 30. An upright strut 25 rigid with the tool bar and connected to the trailing end of the top link 30 maintains the posture of the implement and transmits draft forces from the implement to the draft responsive means on the tractor. The tool bar 50 carries a series of ground working tools, herein shown as cultivator shovels 53 which are adjustably attached to the bar through the medium of the usual depending support members 54. Raising and lowering of the rear cultivator section is effected by means of the main actuator A of the tractor hydraulic system operating through the hitch linkage.

The front cultivator sections are alike, each comprising a frame 55 carrying a plurality of the ground working tools of shovels 53. The frame is supported for vertical adjustment by parallel links 56 pivotally connected to a rigid member 57 of the frame and to a bracket 58 mounted on the tractor. The brackets, in this instance, are located adjacent the front end of the tractor to position the ground working tools of the implement sections intermediate the front and rear wheels of the tractor.

Actuators $A_1$ and $A_2$ (see FIG. 2) are provided for raising and lowering the left and right hand front sections respectively. The actuators in this instance are of the double acting cylinder and piston type. Each includes a cylinder 60a fitted with a working piston 61a. In the exemplary embodiment the cylinders 60a are pivotally secured at one end to brackets 62a rigidly mounted on the tractor as, for example, on the axle housings 26. A piston rod 63a extends from each piston forwardly through a suitable packing gland in the other end of the cylinder for pivotal connection with one arm of a bell crank 64a pivoted on an upright support 65a carried by the bracket 58. The other arm of the bell crank is connected by a tension link 66a with one of the links 56. Accordingly, each front section of the implement may be raised by outward movement of the piston 61a and its cylinder and lowered on movement of the piston in the opposite direction.

Auxiliary Valve Mechanism

Auxiliary actuators such as the actuators $A_1$ and $A_2$ are connected with and made a part of the tractor hydraulic system by the auxiliary valve mechanism AV which provides for the selective and independent control of the actuators as will appear presently. As indicated heretofore, the auxiliary valve mechanism is mounted on the cover plate 36 of the tractor center housing in place of the transfer plate normally provided on conventional tractors. As shown in FIG. 3, this valve mechanism has a body in the form of a generally rectangular metal block 60 having its lower surface machined flat for a sealing fit with the top surface of the cover plate 36. The valve is secured in place by bolts 61 (FIG. 4) threading into holes provided at the cover plate for attachment of the transfer plate.

A series of passages opening through the lower surface of the valve body are positioned to register with the ports or passages in the cover plate. Included are a passage 62 (FIGS. 3 and 4) which registers with an aperture (not shown) in the cover plate opening to the sump S in the tractor center housing. This passage provides for venting fluid from the hydraulic system to the sump.

A second passage 63 (FIGS. 4 and 5) in the valve body registers with a passage 64 (FIG. 2) provided in the cover plate for the accommodation of the pressure fluid conduit 43 leading from the pump P. The conduit is adapted to sealingly engage in the passage 63 when the auxiliary valve mechanism is installed. Thus, all pressure fluid delivered by the pump passes through the auxiliary valve, whether destined for the main actuator A or for the auxiliary actuators. A third passage 65 (FIGS. 4 and 6) in the valve body registers with the passage 66 in the cover plate which opens into the inlet port 67 of the main actuator cylinder 35 as shown in FIG. 2.

The basic auxiliary valve mechanism as shown in FIGS. 3–11 includes two valve units, although, of course, it may be made with any reasonable number of units. The valve units are substantially alike and provision is made for the attachment to the basic unit of an additional, in this case, a third, valve unit, also similar to the other units. For convenience, the corresponding elements of the valve units will be designated by the same reference numerals with appropriate subscripts to identify the units. Thus, the elements of the valve unit shown in FIG. 3 (a portion of which appears in the lower part of FIG. 4) will be identified by the subscript $a$ while the elements of the companion valve unit will be identified by the subscript $b$. Corresponding elements of the third valve unit shown in FIGS. 12–14 will be identified by the subscript $c$.

Referring now to FIG. 3, the valve body 60 is formed with two parallel bores 70a and 71a for each valve unit, the bores being disposed one above the other as shown. The bore 70a is formed with a series of annular grooves defining chambers 72a, 73a, 74a, 75a, 76a, 77a, 78a and 79a, each separated from the adjacent chambers by suitable lands. The bore 70a is fitted with a movable valve member or axially slidable spool 80a dimensioned to sealingly engage the lands in the bore. Reducing portions 81a, 82a, and 83 provide for establishing communication between various ones of the valve chambers as the spool is shifted to different positions.

In the exemplary valve mechanism the spool 80a is yieldably urged by a spring 84a toward a central or neutral position in which it is shown in FIGS. 1 and 2. The spring, in this instance, is interposed between the left end of the spool and a plug 85a closing the adjacent end of the valve bore 70a. The action of the spring is supplemented under certain operating conditions to be described later by pressure fluid operated means enclosed in the left end of the valve bore. The other end of the spool projects from the bore for operative connection with a manual operator herein shown as a hand lever 86a by which the spool may be shifted axially in either direction from the neutral position.

The hand lever 86a as shown is pivotally supported as by a pin 87a on a bracket 88 suitably attached to the valve body 60 and having an outwardly projecting arm for each valve lever including an arm 88a in which the pin 87a is fitted. To provide an operative connection with the spool 80a, the end portion of the lever is slotted transversely as at 89a to straddle the flattened end of the spool and a cross pin 90a fixed to the end of the spool.

Provision is made for releasably latching the hand lever in either of the two operated positions of the valve spool. The latching means in its preferred form comprises a ball detent 91a disposed in a bore 92a in the lever 86a and urged by a compression spring 93a into one or the other of a pair of upwardly opening notches 94a, 95a formed in the bracket arm 88a. A handle member 96a threaded into the outer end of the bore 92a can be screwed in or out to vary the tension of the spring 92a and thus determine the force require to restore the valve spool to neutral position. A clamp nut 97a serves to lock the handle in adjusted position.

The bore 71a, which is located directly above the bore 70a, is divided into two chambers by a restriction defining a narrow passage 100a. The chamber L at the left end of the bore has a port 101a adapted to be connected as by a fitting 102a with a conduit extending to one end of an auxiliary actuator. The chamber R at the other end of the bore also has a port 103a adapted to be connected as by a fitting 104a with the other end of the actuator to which the port 101a is connected assuming that the actuator is of the double acting type. When the valve unit is associated with a single acting actuator, the port 103a is closed by a plug. Communication between the chambers L and R is controlled by a check valve member 105a urged to a position to close the passage 100a by a compression spring 106a. This spring is interposed between a shoulder formed adjacent the head end of the valve member and a plug 107a threaded into the end of the valve bore to close the same. The valve member 105a acts in the manner of a check valve permitting fluid flow in one direction—in this instance, from the valve chamber R into the valve chamber L while positively blocking flow in the opposite direction.

Means is provided for shifting the valve member 105a to open communication between the two chambers when required to exhaust fluid from the actuator connected to the port 101a. This means comprises a shuttle 108a reciprocable in the valve chamber R and having a nose portion 109a at its left end of somewhat smaller diameter than the passage 100a adapted to be projected through the passage 100a to unseat the valve member 105a when the shuttle is shifted leftward. Such shifting is effected by pressure fluid introduced into the right hand end of the chamber R under control of the valve spool 80a as will appear presently. A stem 110a projecting from the other end of the shuttle cooperates with a plug 111a closing the bore 71a to determine the limit position of the shuttle in its movement to the right.

In the exemplary valve, the bores 70a and 71a are connected by three separate passages spaced apart axially of the bores. One passage 112a is located in the same vertical plane as the chamber 78a in the bore 70a (see FIGS. 3 and 6). A second passage 113a is in the same vertical plane as the chamber 76a. The third passage 114a is in the same vertical plane as the chamber 73a (see FIGS. 3 and 8).

The passages 112a and 114a are open to provide communication between the two valve bores at all times while the passage 113a is closed by the shuttle 108a when in the position as shown in FIG. 3. It will be observed that the shuttle overlaps the edge of the passage a substantial amount and that a corresponding movement to the left is required to open the passage. Such movement is effective to shift the check valve member 105a to open position.

Under some conditions of operation, as, for example, when the valve is associated with a double acting actuator, to be discussed in detail hereinafter, opening of the passage 113a is undesirable. To condition the valve mechanism for operation under such conditions, selector means including an adjustable stop member 115a is provided for limiting the range of movement of the valve member 105a from closed position toward the left. The stop member 115a, herein shown as a cylindrical rod, is slidable through a packed opening in the plug 107a. It has an enlarged intermediate portion formed with screw threads adapted to cooperate with internal threads formed in the plug. A finger knob 116a on the projecting end of the stop member provides convenient means by which it may be rotated to adjust its position relative to the check valve member.

The stop member 115a may also be set in selected intermediate positions to permit movement of the associated shuttle 108a through a range effective to partially open the passage 113a. Depending on the extent of such opening, by-passing of the pump output to exhaust is restricted so as to maintain a positive but reduced pressure to the actuator connected to the fitting 104a.

The left hand valve unit is similar in all respects to the right hand unit above described. In addition, provision is made for by-passing its check valve 105b so that control of an auxiliary actuator connected to that valve unit may be transferred to the main valve of the tractor hydraulic system when desired. For this purpose, the valve body is formed with intersecting passages 117, 118 and 119 (FIGS. 6, 7 and 9) defining a fluid channel connecting the right and left hand chambers R and I of the bore 71a. As shown in FIG. 9, flow through the channel is controlled by a valve member 120 in the form of a rod having a pointed tip adapted to cooperate with a valve seat formed at one end of the passage 117. The valve member extends through a plug 121 threaded into a bore in the valve body alined with the passage 117 as shown. External threads on the valve member cooperate with internal threads in the plug to permit the member to be screwed into or out of closed relation to the passage 117. A knob 122 is provided on the projecting end of the valve member for manual opening and closing of the by-pass.

Having in mind the construction and arrangement of the individual valve units, the interrelationship between the units will now be described. Referring to FIG. 4, it will be observed that the second valve unit includes a bore 70b parallel to the bore 70a and located in the same horizontal plane. Passages in the valve body connect various ones in the valve chambers to provide for coordinated operation of the associated actuators.

Figure 5:
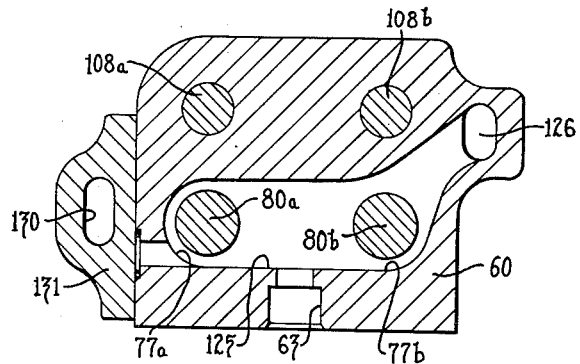

Initially, it may be noted that pressure fluid received through inlet passage 63 is directed to both valve units by way of a cross-passage 125 connecting the valve chambers 77a and 77b (see FIGS. 4 and 5). A passage 126 cored in the valve body connects the chamber 77b with chambers 74b and 75b. Chamber 76b is connected by a passage 127 with chamber 75a while chambers 74b and 74a are connected by a passage 128. Also chambers 72a and 72b are connected by a passage 129 (FIGS. 4 and 10) which opens at the right side of the valve body into a passage 130 formed in a cover plate 131 removably attached as by screws 132 (FIG. 3) to the valve body. A passage 133 connects the chamber 76a with the passage 130 which leads to a passage 134 in the valve body connecting the valve chambers 79a and 79b. As shown in FIGS. 3 and 4, the vent passage 62 leading to the sump opens into the chamber 79a. It is also to be noted that the passage 65 leading to the main actuator A opens into the valve chamber 78b (see FIGS. 4 and 6).

Provision is made for automatically returning either valve spool from a "raise" to the neutral position upon a predetermined increase in pressure in the fluid supply to the associated actuator. The pressure at which such action takes place is determined in part by the tension of the spring 93a or 93b urging the hand lever detent into its latching notch. In the raising position of the valve, the actuator lever is rocked back to the position shown in broken lines in FIG. 3. In this position, the valve spool is shifted to the right, introducing pressure fluid into the valve chamber 78a or 78b.

Associated with the left end of each valve spool is pressure fluid operated means for reinforcing or supplementing the action of the spring 84a, 84b to return the spool to neutral position. As both are alike, a description of one fluid operated means, as, for example, that associated with the right hand spool 80a will suffice.

As shown on an enlarged scale at FIG. 11, the left end portion 135a of the spool 80a is reduced in diameter and fitted with a sliding sleeve 136a which abuts the shoulder formed at the end of the reduced portion of the spool. The sleeve has a flange 137a at the end adjacent the shoulder forming a seat for one end of the spring 84a and adapted to engage the end wall of the valve chamber 79a to define the limit position to which the valve spool can be shifted by the spring.

The other end of the sleeve 136a is counterbored to a diameter somewhat larger than the end portion of the spool to slidably receive a bushing 138a fixed to the spool as by a snap ring 139a. This bushing has a flange at its outer end defining a stop for a washer 140a against which the other end of the spring 84a seats when the spool is in neutral or in a "lowering" position.

Extending through the reduced end portion of the valve spool to the first land is an axial passage 141a opening to a transverse passage 142a in the land. Intermediate its ends the passage 141a opens through ports 143a to the space between the sleeve 136a and the bushing 138a. A shoulder in the passage 141a defines a seat for a ball valve element 144a which is urged into sealing engagement therewith by a compression spring 145a. A plug 146a threaded into the end of the bore 141a provides an abutment for the spring and by screwing the plug in and out the tension of the spring can be adjusted to vary the pressure at which the valve element 144a will be forced from its seat to admit pressure fluid into the sleeve 136a.

The operation of the mechanism above described will be readily apparent. Thus, when the spool 80a is shifted to the right, passage 142a is opened to the valve chamber 78a. Such shifting of the valve spool carries with it the washer 140a and since the sleeve 136a is restrained against movement by engagement with the end of the valve chamber, spring 84a is compressed and exerts a predetermined biasing force on the spool tending to return it to the left. The spool 80a will be retained in the operated position by the detent 91a engaging in the notch 94a until the force exerted by the spring 84a is supplemented by an additional force.

The additional force required for moving the valve spool from operated position is provided when the pressure in the valve chamber 78a increases sufficiently to unseat the ball valve 144a. When that occurs, fluid flows through the passages 142a, 141a and ports 143a to the space between the sleeve and bushing and urges the bushing and spool to the left. The force thus exerted on the spool snaps the detent 91a from its associated notch and shifts the spool 80a to the left until the washer 140a seats against the plug 85a as the spool reaches the neutral position. This, of course, cuts off the flow of pressure fluid to the valve chamber 78a. When the companion valve spool is also returned to neutral position, the source of pressure fluid is vented to the sump as previously described.

*Operation With Locked Draft Links*

The two-unit valve mechanism is not intended for use with implements of the particular type shown in FIG. 1 for which the three-unit valve mechanism to be described later on is better suited. However, the valve mechanism shown in FIGS. 3–11 may be used to control the main actuator A and either single acting or double acting auxiliary actuators with or without control of the latter by the main valve V of the tractor hydraulic system.

As a matter of convenience, consideration will first be given to the operation of the valve mechanism under conditions in which the draft links of the tractor are not used but are locked against movement by the stay bars conventionally used for that purpose. When the draft links are locked against movement in a tractor having a hydraulic system of the type shown in FIG. 2, the pump P is placed in operation by swinging the control lever 45 down into the lower end of its position control range. Lever 44 is swung upwardly to shift the main valve V to "raise" position, thus placing the pump in operation and fluid under pressure is supplied to the pressure fluid conduit 43.

No excess pressure is developed in the system under those conditions nor is there any waste of power while the actuators are idle since the pressure fluid delivered by the pump is diverted back to the sump as long as the valve spools 80a and 80b remain in neutral position. The diversion path may be traced in FIG. 4 from the pressure inlet passage 63, passages 125 and 126 to valve chamber 75b. The reduced portion 82b of the plunger 80b permits the fluid to flow into valve chamber 76b and by way of passage 127 to valve chamber 75a. Here the reduced portion 82a of the valve spool 80a directs the fluid to valve chamber 76a from which it flows by way of passages 133 and 130 to valve chamber 79a and out through the vent passage 62 to the sump.

Assuming that the auxiliary actuators to be operated and controlled are of the single acting type, they are connected respectively to the valve ports 101a and 101b. Ports 103a and 103b are closed by plugs. Selector members 115a and 115b are screwed out to permit the full range of movement of the check valve members 105a and 105b and their shuttles 108a and 108b. By-pass valve member 122 is screwed in to close the by-pass around the left hand check valve 105b.

When it is desired to raise the left hand actuator, valve spool 80b is shifted to the right by rocking its actuating lever 86b counterclockwise. The valve spool interrupts communication between valve chambers 75b and 76b and thus interrupts the diversion of pressure fluid to the sump. It also establishes communication between valve chambers 77b and 78b for the flow of pressure fluid from the passage 125.

Valve chamber 78b is in communication with the left end of the shuttle chamber R and the fluid thus admitted to the chamber shifts the shuttle 108b to the right to withdraw its tip portion 109b from the passage 100b. Fluid may thus enter the passage and displace the check valve member 105b to permit flow of fluid through the port 101b to the auxiliary actuator.

Return of the valve spool 80b to neutral position again vents the pressure fluid supply to the sump. The operated actuator, however, does return as the valve member 105a closes the passage 100a to trap the fluid in the actuator.

To initiate the exhaust of fluid from the actuator, valve spool 80b is shifted to the left by swinging its actuating lever 86b in a clockwise direction. The valve spool again stops the diversion of pressure fluid by interrupting communication between valve chamber 75b and 76b. It also opens communication between valve chamber 74b and 73b, the latter of which is connected by passage 114b with the right end of the shuttle chamber R. Shuttle 108b is thereby shifted to the left, moving the check valve member 105b to open position so that fluid may exhaust from the actuator through the passages 100b and 112b, valve chamber 78b, around tthe reduced portion 83b, valve spool 80b to valve chamber 79b and thence by way of passage 134 and valve chamber 79a to vent passage 62.

The movement of the shuttle 108b, in this instance, is sufficient to open the passage 113b to direct the pressure fluid supply to the chamber 76a of the companion valve to permit operation of the other auxiliary actuator if desired. However, when the companion valve spool 80a is in neutral position, the pressure fluid is diverted to the sump to avoid pumping against unnecessarily high pressure. The auxiliary actuator connected to the right hand valve unit can be raised or lowered in precisely the same manner by manipulation of the hand lever 86a. Furthermore, both actuators may be operated in a raising or lowering direction simultaneously except when the right hand unit is set for single action actuator operation and the valve spool is shifted to the lowering position. Thus, maximum flexibility is afforded in the operation of the auxiliary actuators.

The auxiliary valve mechanism can be conditioned for operation with double acting hydraulic actuators by a simple adjustment of the selector members 115a and 115b. The selector members are screwed in to limit leftward movement of the check valve members 105a and 105b so that the associated shuttles when shifted to open the check valves do not advance far enough to uncover the passages 113a and 113b. By-pass valve member 120 is left in the closed position.

With the ports 101a and 103a connected to opposite ends of one actuator selector and ports 101b and 103b connected to opposite ends of the other actuator, either actuator may be operated independently in either direction. Movement of the valve spool 80b to the "raise" position (to the right) directs pressure fluid via passages 63 and 125, valve chambers 77b and 78b, passages 112b and 100b, past the check valve 105b to the port 101b. At the same time, an exhaust path is established from the port 103b, passage 114b to valve chamber 73b, thence by way of passages 129, 130 and 134 and valve chambers 79a to the vent passage 62.

Upon movement of the valve spool 80b to its alternate position (to the left) pressure fluid is directed via passages 63, 125 and 126, valve chambers 74b and 73b and passage 114b to the right end of the shuttle chamber R from which the port 103b opens. The pressure fluid flows to the actuator and additionally forces shuttle 108b to the left to open check valve 105b. Fluid may then be exhausted from the actuator through the port 101b, passages 100b and 112b and valve chambers 178b and 179b and passage 134 to the vent passage 62.

Control of the actuator connected to the right hand valve unit is effected in precisely the same manner by shifting the valve spool 80a. By reason of the novel porting and passage arrangement full control of either actuator may be exercised independently. More particularly, the actuators may be operated in a "raise" or "lower" direction simultaneously or sequentially or one may be operated in a "raise" direction while the other is operated in a "lower" direction.

The improved valve mechanism may also be used in installations in which both single acting and double acting actuators are installed. When both types of actuators are to be controlled, the double acting actuator should be connected to the valve unit or units to the right of the unit connected to the single acting actuator or actuators. As previously described, the valve units are conditioned for operation with the particular actuator with which they are connected by screwing the selector member 115a, 115b out for single acting actuators and in for double acting actuators. The by-pass valve 120, of course, remains in closed position.

Operation With Free Draft Links

The operations above described contemplate the locking of the tractor draft links against movement by the installation of suitable stay bars. The improved auxiliary valve mechanism, however, is equally well adapted for use with the tractor hydraulic system when the draft links are left free for movement. Moreover, the auxiliary valve mechanism may be utilized to control the main actuator of the tractor hydraulic system or, alternatively, the tractor's main valve V may be utilized to operate one of the actuators under automatic draft control. The latter is particularly advantageous for the control of ground working implements adapted to be pulled behind the tractor. When the latter type of operation is contemplated, the actuator to be controlled by the main valve is connected to the valve port 101b while the port 103b is closed by a plug. Selector member 115b is screwed in to check movement of the valve 105b as above explained. By-pass member 120 is screwed out to open the by-pass around the check valve.

With the valve mechanism set as above, movement of the valve spool 80b to the "raise" position (to the right) establishes communication between the valve chamber 77b and 78b thereby directing pressure fluid to both the main and auxiliary actuators. The flow path is from the inlet passage 63, passage 125, valve chambers 77b and 78b and passage 65 to the main actuator. From the valve chamber 78b a branch flow path extends by way of passage 112 to bore 71b, passages 117, 118 and 119 to the chamber at the back of the check valve and to port 101b. There is also a parallel flow path through the passage 100b as the check valve 105b is shifted to open position by the pressure of the fluid.

Operation of the main and auxiliary actuators is now regulated by the draft responsive means of the tractor operating through the main valve V. When the valve V is moved to "raise" position, pressure fluid is supplied to both actuators in the same manner in which such action normally takes place on the tractor. Movement of the valve V to "lower" position vents both actuators, the exhaust from the auxiliary actuator being through the by-pass around the check valve 105b. The actuators may also be operated in a "raise" or "lower" direction by manipulation of the control lever 45 of the tractor.

The right hand valve unit may be utilized for controlling a second auxiliary actuator. Control is limited, however, as the control lever on the tractor must first be set to raise the main actuator and first auxiliary actuator to their upper limit positions. Pressure fluid then becomes available for the operation of the second actuator connected to the right hand valve unit. Control of that actuator, whether single or double acting, is effected in the manner previously described.

When it is desired to control the main actuator of the tractor and one auxiliary actuator by means of the auxiliary valve mechanism, the auxiliary actuator is connected to the valve ports 101a and 103a. Ports 101b and 103b are plugged. By-pass valve 120 may be closed and selector member 115b be set for single acting operation. Selector member 115a is set for either single acting or double acting operation as determined by the character of the auxiliary actuator. With the control levers of the tractor set to place the pump P in operation, complete control of the main and auxiliary actuators is available by manipulation of the valve levers 86b and 86a, respectively.

Three Unit Valve Mechanism

The basic valve mechanism as above described, may be adapted for controlling an additional auxiliary actuator or for selectively and independently controlling the main actuator and two auxiliary actuators by the addition of a third valve unit which the mechanism is expressly designed to accommodate. Referring to FIGS. 12–14, this third valve unit has a body 150 adapted to be attached to the valve body 60 in place of the cover plate 131. The body 150 is formed with two bores 70c and 71c corresponding to the previously described bores and with ports and passages precisely like those of the right hand valve unit. The ports and passages are designated by similar reference characters with the subscript c. The valve body 150 is also formed with a longitudinal passage 130' corresponding to the passage 130 in the cover plate 131 which it replaces.

As will be seen by reference to FIGS. 12–14 of the drawings, the valve body 150 has a passage 129' adapted to register with the passage 129 in the valve body 60 and connect the latter passage with the valve chamber 72c and with the passage 130'. A passage 128' registers with the passage 128 and thus establishes communication between the valve chamber 74c and chambers 74a and 74b. A passage 127' with an offset at its inner end connects the valve chambers 76a and 75c by way of the passage 133 in the main body. A passage 125' extends the fluid supply passage 125 to the valve chamber 72c. Finally, a passage 134' connects the valve chamber 79c with the exhaust passage 134 leading to the vent passage 62.

It will be evident from the above that the third valve unit is adapted to function in precisely the same manner as the second valve unit above described in controlling a single or double acting auxiliary actuator. This auxiliary valve mechanism is particularly well adapted for the control of implements of the types shown in FIGS. 1 and 2 which require independent control of the main actuator A and two auxiliary actuators A1 and A2.

For operation with the above tractor implement combination, the auxiliary valve mechanism is bolted to the tractor cover plate 36 in place of the transfer plate as shown in FIG. 2. As the rear implement section is mounted on the tractor draft links, it is desirable to place the main actuator A under control of the left hand unit of the auxiliary valve mechanism. Ports 101b and 103b of the auxiliary valve are therefore closed as by means of plugs 151 and 152 so that the raising and lowering of the rear section may be effected by manipulation of the control lever 86b.

The actuator A₁ for the left hand implement section is preferably connected to the center valve unit of the auxiliary valve mechanism. Since this actuator is of the double acting type, the "lift" end of the actuator cylinder 60a is connected by a conduit 153 with the valve port 101a. The other end of the actuator cylinder is connected by a conduit 154 and fitting 104a with the valve port 103a. Accordingly, this actuator may be operated to raise the associated implement section by pulling back the hand lever 86a and conversely the section may be lowered by rocking the hand lever forwardly.

Similarly the actuator A₂ for the right hand implement unit is connected to the right hand valve unit of the auxiliary valve mechanism. This actuator is also of the double acting type and the "lift" end of the cylinder is connected by a suitable conduit with the port corresponding to port 101a of the companion valve. The other end of the actuator is connected by a conduit with the valve port corresponding to port 103a of the companion valve. Accordingly, this implement section may be raised by pulling back the hand lever 86c and lowered by rocking the hand lever forwardly.

The rear implement section, of course, may be raised or lowered independently by manipulating the hand lever 86b. When all of the hand levers are in the neutral position as shown in FIG. 12, pressure fluid delivered by the pump through the inlet port 63 is diverted by way of the passage 77b, chamber 75b, valve section 82b, passage 127, valve chambers 75a and 76a, passages 133 and 127', valve chambers 75c and 76c and passages 130' and 134 to the exhaust passage 62. The pump therefore operates idly without building up excessive pressure in the system.

Movement of the hand lever 86b to the "raise" position shifts the valve spool 80b to the right as shown in FIG. 13, thereby opening communication between the valve chambers 77b and 78b to direct pressure fluid through the port 65 to the main actuator A. The valve spool also closes communication between the ports 75b and 76b, thus interrupting the exhaust of fluid to the sump so that the pressure in the system builds up to the value for which the system is set.

When the implement section is raised to its desired height, return of the valve spool 80b to neutral position closes off chamber 78b from 77b and thus traps fluid in the main actuator cylinder to hold the implement at such height. Pressure fluid from the pump is, of course, diverted to the other valve units so that the actuators which they control may now be raised or lowered by appropriate manipulation of the hand levers for shifting the valve spools.

To lower the main actuator, the hand lever 85b is swung forwardly to shift the spool 80b leftward to the position shown in FIG. 14. Port 65 connected with the main actuator is thus placed in communication with the valve chamber 79a which in turn is connected by way of passage 134 with the chamber 79a terminating the exhaust port 62. Fluid is accordingly exhausted from the main actuator as the draft links descend under the load imposed on them by the rear implement section. Lowering of the links may be interrupted at any time by returning the valve spool to neutral position.

Figure 8:
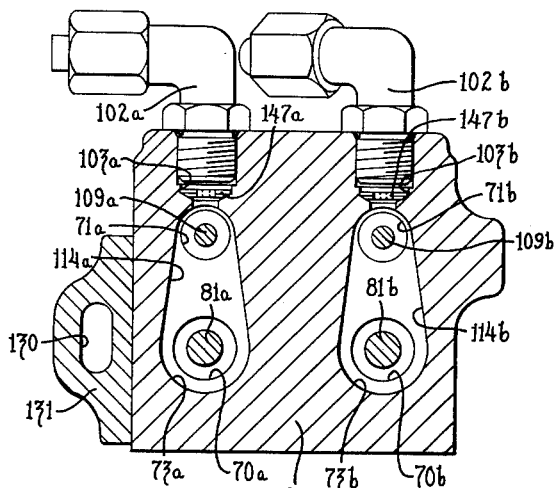

Provision is made for restricting the flow of pressure fluid to the auxiliary actuators so that they may be operated simultaneously in a lowering direction regardless of whether or not they are equally loaded. For this purpose each of the valve ports 103a, 103b and 103c is formed with a conical seat at its inner end as shown in FIGS. 3 and 8. Interposed in the respective ports between the seat and the associated fitting 104a, 104b or 104c is a thin flat washer 147a, 147b, 147c, each of which has a small drilled orifice through its center. The edge portions of the discs are notched to provide a substantially unrestricted flow passage for fluid entering from the actuator through a fitting and pressing the associated disc against the conical seat of the passage. However, upon reversal of fluid flow, that is, flow toward the actuator, the disc is forced against the end of the fitting. The notches in the disc are thus closed to fluid flow and flow is restricted to the orifice in the disc. The orifices, of course, may be proportioned to issue a supply of fluid to each actuator regardless of the load imposed thereon.

It will be apparent from the foregoing that the invention provides an auxiliary valve mechanism of novel and advantageous construction which materially widens the range of utility of conventional hydraulically equipped tractors. The improved valve mechanism may be utilized in various ways for the control of either single or double acting actuators. With tractor hydraulic systems of the type shown, it may be used with tractor draft links either locked in a fixed position or with the links free for operation. With the tractor draft links locked by the usual stay bars, the auxiliary valve mechanism may be utilized to control two auxiliary actuators, or with the third valve unit added, to control three auxiliary actuators, any one or all of which may be either single or double acting. When used with the draft links free, the auxiliary valve mechanism may be utilized to control two or three auxiliary actuators and the actuator connected with the left hand valve unit may, if desired, be conditioned for control by the draft responsive mechanism of the tractor. In such case, of course, the auxiliary actuator is of the single acting type, although the second and third actuators may be either single acting or double acting as desired.

Finally, the auxiliary valve mechanism may be connected so as to place the main actuator under control of the left hand valve unit while the other valve units may be utilized to control single or double acting actuators. Furthermore, the left hand valve unit may be utilized as a selector to place the control of the tractor main actuator either under control of the draft responsive mechanism or may itself exercise control.

The improved auxiliary valve mechanism is simple and rugged in construction. It can be installed in the tractor without requiring any structural alteration by merely bolting it to the top of the cover plate housing in place of the transfer plate normally provided in that position. When installed, it provides complete control of auxiliary actuators and when desired it may be set to allow the tractor to operate in its normal manner under draft or position control.

We claim as our invention:

1. Auxiliary valve means for use with a tractor hydraulic system including a main actuator, a fluid supply conduit extending to the actuator, a source of fluid pressure, and main valve means shiftable to alternative positions to effect in one position the delivery of fluid from said source through said conduit to said main actuator and to effect in the other position exhaust of fluid from the actuator through said conduit, said auxiliary valve means having ports by which it may be interposed in said fluid supply conduit, said auxiliary valve having other ports and passages and a valve member movable to positions to block the flow of pressure fluid to or from said main actuator, to permit fluid flow to or from the main actuator under control of said main valve means, and to divert the fluid from said source to exhaust while blocking discharge of fluid from the main actuator.

2. Auxiliary valve mechanism for use with a tractor having a hydraulic system including a main actuator, means for delivering fluid under pressure to the main actuator, main valve mechanism controlling the delivery of fluid from said means to and exhaust of fluid from the main actuator, and an auxiliary actuator, said auxiliary valve mechanism having ports by which it may be connected to receive fluid from said means and operative to direct the flow of pressure fluid to and exhaust of fluid from the auxiliary actuator, a check valve operative to prevent exhaust of fluid from the auxiliary actuator when the auxiliary valve mechanism is set in neutral position, and means for establishing a by-pass around said check valve so as to place said auxiliary actuator under control of the main valve when the auxiliary valve is set in position to direct fluid flow to the auxiliary actuator.

3. Auxiliary valve mechanism for use with a tractor having a hydraulic system including a main actuator, means for delivering fluid under pressure to the main actuator, main valve mechanism controlling the delivery of fluid from said means to and exhaust of fluid from the main actuator, and an auxiliary actuator, such auxiliary valve mechanism having ports by which it may be connected to receive fluid from said means, two valve units connected by ports and passages, one of said valve units being settable in one position to shut off the fluid supply from the other valve unit and for placing the main actuator under control of the main valve, said one valve unit being settable in another position to shut off the fluid supply from the main actuator and direct the fluid to the auxiliary actuator by way of the other valve unit.

4. Auxiliary valve mechanism for use with a tractor having a hydraulic system including a main actuator, means for delivering fluid under pressure to the main actuator, a main valve mechanism controlling delivery of fluid from said means to and exhaust of fluid from the main actuator, and an auxiliary actuator, said auxiliary valve mechanism having ports by which it may be connected to receive fluid from said means and operative to direct the flow of pressure fluid to and exhaust of fluid from the auxiliary actuator, and means for conditioning said auxiliary valve mechanism for transferring control of the auxiliary actuator to said main valve mechanism.

5. Auxiliary valve mechanism for use with a tractor having a hydraulic system including a main actuator and a source for delivery of pressure fluid through a supply conduit to said main actuator, said auxiliary valve mechanism having ports by which it may be connected to receive pressure fluid from said conduit, a check valve, a shuttle and a valve member movable to one position to direct fluid from said source through said check valve and to shift said shuttle to a retracted position, said valve member being movable to another position to direct pressure fluid from said source to shift said shuttle in a direction to open said check valve, an exhaust passage adapted to be opened by said shuttle upon predetermined movement in said check valve opening direction, and adjustable means for restricting the movement of the shuttle to an extent sufficient to open the check valve while maintaining the exhaust passage closed.

6. For use with a tractor having a hitch linkage adapted to be raised and lowered by a main hydraulic actuator and a source of fluid under pressure for operating the main actuator, a single acting auxiliary actuator, auxiliary valve mechanism including a valve body having spaced parallel bores, one of said bores having a port at one end, conduit means connecting said port with said auxiliary actuator, a check valve disposed in said one bore between said port and the other end of the bore normally operative to restrict fluid flow to one direction, a shuttle reciprocable in said one bore, the other of said bores having a connection with said fluid source, with an exhaust passage and with said one bore, a valve member in said other bore movable between a neutral position and two operated positions, said valve member being operative in one operated position to direct pressure fluid to said one bore between said check valve and said shuttle and to connect the end of the bore behind said shuttle to said exhaust passage whereby to retract the shuttle and direct pressure fluid through the check valve to said auxiliary actuator, and said valve member being operative in the other operated position to reverse the connections to said one bore, said shuttle being shifted by the pressure fluid in a direction to open said check valve and permit discharge of fluid from the auxiliary actuator through said exhaust passage.

7. For use with a tractor having a hitch linkage adapted to be raised and lowered by a main hydraulic actuator and a source of fluid under pressure for operating the main actuator, a single acting auxiliary actuator, auxiliary valve mechanism including a valve body having spaced parallel bores, one of said bores having ports at opposite ends, conduit means connecting one of said ports connected with said auxiliary actuator, the other of said ports being permanently closed, a check valve disposed in said one bore between said ports normally operative to restrict fluid flow to one direction, a shuttle reciprocable in said one bore, passages in said valve body connecting said other bore with said fluid source, with an exhaust passage and with said one bore, a valve member in said other bore shiftable from a neutral position in opposite directions to two operated positions, said valve member being operative in one operated position to direct fluid from said source to said one bore between said check valve and said shuttle while connecting the end of the bore at the opposite end of the shuttle to said exhaust passage, said fluid passing through the check valve to the actuator, said check valve acting to prevent exhaust of fluid from the actuator upon return of said valve member to neutral position, and said valve member being operable in the other operated position to reverse the pressure fluid and exhaust connections to said one bore to shift said shuttle in a direction to open said check valve and initiate exhaust of fluid from said auxiliary actuator.

8. For use with a tractor having a hitch linkage adapted to be raised and lowered by a main hydraulic actuator and a source of fluid under pressure for operating the main actuator, auxiliary valve mechanism for controlling the delivery of pressure fluid from said source to auxiliary actuators, said valve mechanism comprising a valve body having spaced parallel bores, a port at one end of one of said bores adapted to be connected alternatively to the single port of a one-way hydraulic actuator or to one of the ports of a two way hydraulic actuator, a check valve positioned to allow fluid flow from the bore to the port while restricting flow in the opposite direction, a port at the other end of said one bore adapted to be closed by a plug when the other port is connected to a one-way actuator or to be connected to the other port of the two-way actuator to which the companion port is connected, a shuttle reciprocable in said one bore, a valve member in the other of said bores shiftable to a neutral position in either direction to two operated positions, said valve member being operative in one position to direct pressure fluid to said one bore between said shuttle and said check valve while connecting the other end of said one bore to exhaust, said valve member being operative in its other position to direct pressure fluid into the other end of said one bore to advance the shuttle in a direction to open said check valve and to open the other end of the bore to exhaust, and a selector member settable to restrict the movement of said shuttle to a range permitting opening of the exhaust valve without opening said other end of the bore to exhaust to adapt the valve mechanism for use with a two-way actuator.

9. Auxiliary valve mechanism for use with a tractor hydraulic system including a main actuator, a fluid reservoir, and a pump operative to draw fluid from said reservoir and deliver it under pressure through a supply conduit, said auxiliary valve mechanism comprising a valve body having a pair of parallel valve bores, an inlet port in said valve body terminating said conduit and connected by passages with both of said valve bores, other passages connecting said valve bores to an exhaust port opening to said fluid reservoir, a port opening into one of said valve bores and connected to the main actuator, a valve member in each valve bore shiftable from a neutral position in either direction to two operated positions, said passages and said valve members being interrelated so as to establish communication between said inlet port and said exhaust port with the valve members in their neutral positions, the valve member in said one bore being operative upon movement to one operated position to interrupt communication between the inlet and exhaust ports and establish communication between the inlet port and the port connected to the main actuator, such valve member being operative upon movement to its other operated position to interrupt communication between said inlet and exhaust ports and to establish communication between the main actuator connected port and the exhaust port, and a valve member reciprocable in the other valve bore to control the connections between the inlet port and the exhaust port to an auxiliary actuator.

10. Valve mechanism comprising, in combination, a valve body having a bore with a series of chambers spaced apart along its length, a valve spool shiftable in said bore from a neutral position in either direction to two operated positions, a source of pressure fluid connected to one of the valve chambers, a port opening from an adjacent chamber for connection with an actuator, said valve spool being operative in neutral position to block communication between said chambers and in one operated position to open communication between the chambers for directing pressure fluid from said source to said actuator connected port, spring means urging said valve spool toward the neutral position, detent means operative to retain said spool in said one operated position against the force exerted by said spring means, pressure fluid operated means for supplementing the force exerted by said spring means on said valve spool, said valve spool having a passage effective to establish communication between said actuator connected chamber and said pressure fluid operated means upon movement of the valve spool to said one operated position, and adjustable valve means for maintaining said passage closed until the pressure in said actuator connected chamber exceeds a predetermined value.

11. Valve mechanism comprising, in combination, a valve body having a bore with a series of chambers spaced apart along its length, a valve spool shiftable in said bore from a neutral position in either direction to two operated positions, a source of pressure fluid connected to one of the valve chambers, a port opening from an adjacent chamber for connection with an actuator, said valve spool being operative in neutral position to block communication between said chambers and in one operated position to open communication between the chambers for directing pressure fluid from said source to said actuator connected port, spring means urging said valve spool toward the neutral position, detent means operative to retain said spool in said one operated position against the force exerted by said spring means, pressure fluid operated means for supplementing the force exerted by said spring means on said valve spool, said valve spool having a passage effective to establish communication between said actuator connected chamber and said pressure fluid operated means upon movement of the valve spool to said one operated position, a spring biased valve in said passage operative to close the same against fluid flow from said actuator connected chamber until the pressure therein exceeds a predetermined value, and means for adjusting the tension of the valve biasing spring to determine the pressure required to open the valve.

12. Valve mechanism comprising, in combination, a valve body having a bore with a series of chambers spaced apart along its length, a valve spool shiftable in said bore from a neutral position in either direction to two operated positions, a source of pressure fluid connected to one of the valve chambers, a port opening from an adjacent chamber for connection with an actuator, said valve spool being operable in neutral position to block communication between said chambers and in one operated position to open communication between the chambers for directing pressure fluid from said source to said actuator connected port, spring means urging said valve spool toward the neutral position, detent means operative to retain said spool in said one operated position against the force exerted by said spirit means, a sleeve member mounted on said spool with one end bearing against a shoulder on the spool when the spool is in neutral position, said sleeve member abutting a shoulder in the valve body upon movement of the spool to said one operated position, said sleeve member having a bore in its other end, a bushing slidably mounted on the plunger and having one end telescoping into the bore in said sleeve member, said bushing having its other end bearing against a stop carried on the valve spool, and a passage opened by said spool upon movement to said one operated position for introducing pressure fluid into the bore in said sleeve member to urge the sleeve member and the bushing in opposite directions and thereby supplement the force exerted on said valve spool by said spring means to the extent required to return the valve spool to neutral position.

13. Valve mechanism comprising, in combination, a valve body having a bore with a series of chambers spaced apart along its length, a valve spool shiftable in said bore from a neutral position in either direction to two operated positions, a source of pressure fluid connected to one of the valve chambers, a port opening from an adjacent chamber for connection with an actuator, said valve spool being operable in neutral position to block communication between said chambers and in one operated position to open communication between the chambers for directing pressure fluid from said source to said actuator connected port, spring means urging said valve spool toward the neutral position, detent means operative to retain said spool in said one operated position against the force exerted by said spring means, a sleeve member mounted on said valve spool with one end bearing against a shoulder on the spool when the spool is in neutral position, said sleeve member being restrained against movement by a shoulder on the valve body upon movement of the spool to said one operated position, said sleeve member having a bore of substantially greater diameter than said valve spool opening in its other end, a bushing slidably mounted on the plunger and having one end telescoping into the bore in said valve member, said bushing having its other end bearing against a stop element carried by the spool, and a passage extending axially of said valve spool and opened incident to the movement of the spool to said one operated position for introducing pressure fluid into the bore in said sleeve member to urge the sleeve member and the bushing in opposite directions whereby to supplement the force exerted on said valve spool by said spring means to return the spool to neutral position.

References Cited in the file of this patent

UNITED STATES PATENTS

| | | |
|---|---|---|
| 2,184,793 | Clench | Dec. 26, 1939 |
| 2,243,364 | Trautman | May 27, 1941 |
| 2,403,519 | Gardiner | July 9, 1946 |
| 2,618,121 | Tucker | Nov. 18, 1952 |
| 2,765,627 | Chambers et al. | Oct. 9, 1956 |
| 2,766,585 | Wittren | Oct. 16, 1956 |
| 2,830,561 | Lindstrom | Apr. 15, 1958 |
| 2,841,960 | Holan et al. | July 8, 1958 |
| 2,856,960 | Stacey | Oct. 21, 1958 |
| 2,888,805 | Czarnocki | June 2, 1959 |

FOREIGN PATENTS

| | | |
|---|---|---|
| 639,280 | Great Britain | June 28, 1950 |